(12) United States Patent
Weaver (10) Patent No.: US 8,245,267 B2
(45) Date of Patent: Aug. 14, 2012

(54) METHODS, SYSTEMS, AND PRODUCTS FOR RECORDING MEDIA ON A USER DEVICE

(75) Inventor: Timothy H. Weaver, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 909 days.

(21) Appl. No.: 11/413,885

(22) Filed: Apr. 28, 2006

(65) Prior Publication Data

US 2007/0256112 A1    Nov. 1, 2007

(51) Int. Cl.
*H04N 7/173* (2011.01)
(52) U.S. Cl. ...................................................... 725/134
(58) Field of Classification Search ............. 725/92–93, 725/115–116, 144–149
See application file for complete search history.

(56) References Cited

U.S. PATENT DOCUMENTS

| | | | |
|---|---|---|---|
| 4,903,130 A | 2/1990 | Kitagawa et al. | |
| 5,255,180 A | 10/1993 | Shinoda et al. | |
| 5,313,282 A | 5/1994 | Hayashi | |
| 5,331,354 A | 7/1994 | Koyama et al. | |
| 5,731,764 A | 3/1998 | Tanaka | |
| 6,078,589 A | 6/2000 | Kuechler | |
| 6,088,722 A * | 7/2000 | Herz et al. | 709/217 |
| 6,237,022 B1 | 5/2001 | Bruck | |
| 6,324,182 B1 | 11/2001 | Burns | |
| 6,591,423 B1 | 7/2003 | Campbell | |
| 6,647,411 B2 | 11/2003 | Towell | |
| 6,757,796 B1 | 6/2004 | Hofmann | |
| 6,870,463 B2 | 3/2005 | Dresti et al. | |
| 6,918,131 B1 * | 7/2005 | Rautila et al. | 725/34 |
| 6,934,964 B1 * | 8/2005 | Schaffer et al. | 725/46 |
| 7,065,709 B2 * | 6/2006 | Ellis et al. | 715/719 |
| 2001/0046372 A1 * | 11/2001 | Astle et al. | 386/83 |
| 2002/0108127 A1 | 8/2002 | Lew | |
| 2002/0133830 A1 | 9/2002 | Kim | |
| 2003/0046704 A1 * | 3/2003 | Laksono et al. | 725/96 |
| 2003/0067554 A1 | 4/2003 | Klarfeld | |
| 2003/0088878 A1 | 5/2003 | Rogers | |
| 2003/0118014 A1 * | 6/2003 | Iyer et al. | 370/389 |
| 2004/0015993 A1 * | 1/2004 | Yacenda et al. | 725/87 |
| 2004/0078814 A1 | 4/2004 | Allen | |
| 2004/0133907 A1 * | 7/2004 | Rodriguez et al. | 725/14 |
| 2004/0177370 A1 * | 9/2004 | Dudkiewicz | 725/46 |
| 2004/0255336 A1 | 12/2004 | Logan | |
| 2004/0268407 A1 | 12/2004 | Sparrell et al. | |
| 2004/0268410 A1 | 12/2004 | Barton | |
| 2005/0081252 A1 | 4/2005 | Chefalas | |
| 2006/0268099 A1 * | 11/2006 | Potrebic et al. | 348/14.01 |
| 2007/0079345 A1 * | 4/2007 | McEnroe | 725/106 |
| 2007/0122108 A1 * | 5/2007 | Bontempi | 386/83 |
| 2007/0130585 A1 * | 6/2007 | Perret et al. | 725/46 |
| 2007/0154170 A1 * | 7/2007 | Monroe | 386/83 |
| 2007/0250863 A1 * | 10/2007 | Ferguson | 725/46 |
| 2007/0277201 A1 * | 11/2007 | Wong et al. | 725/40 |

* cited by examiner

*Primary Examiner* — Vivek Srivastava
*Assistant Examiner* — Alfonso Castro
(74) *Attorney, Agent, or Firm* — Cantor Colburn LLP (57) ABSTRACT

Methods, devices, and products are disclosed for recording media. A network command message is received that identifies media to be recorded by a user's device. The network command message was sent on behalf of a provider and comprises the provider's instruction to have the user's device record the media. An entry is created in a recording schedule to record the media. The media is received and recorded such that the provider schedules recording of the media.

1 Claim, 11 Drawing Sheets

METHODS, SYSTEMS, AND PRODUCTS FOR RECORDING MEDIA ON A USER DEVICE

CROSS-REFERENCE TO RELATED APPLICATIONS

This application relates to the following co-pending and commonly-assigned applications, with each application incorporated herein by reference: U.S. application Ser. No. 11/300,125, filed Dec. 14, 2005 and entitled "Presence Detection in a Bandwidth Management System"; U.S. application Ser. No. 11/300,061, filed Dec. 14, 2005 and entitled "Methods, Systems, and Devices for Bandwidth Conservation"; U.S. application Ser. No. 11/178,075, filed Jul. 8, 2005 and entitled "Methods, Systems, and Devices for Securing Content"; U.S. application Ser. No. 11/304,264, filed Dec. 14, 2005 and entitled "Methods, Systems, and Computer Program Products For Providing Traffic Control Services"; U.S. application Ser. No. 11/703,352, filed Feb. 7, 2007 and entitled "Methods And Systems For Image Processing"; U.S. application Ser. No. 11/413,886, filed Apr. 28, 2006 and entitled "Methods, Systems, and Products for Recording Media"; and U.S. application Ser. No. 11/703,325, filed Feb. 7, 2007 and entitled "Methods, Systems And Products for Targeting Media".

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to recording or to copying of media.

Service and network providers should be able to command a user's digital video recorder. In today's video recording environment, the recorder's operation is initiated by the user. The user views the schedule of programs (usually presented as a grid in an electronic programming guide), selects the desired program, and then instructs the video recorder to record that program. If, however, a network provider or service provider could instruct the user's video recorder to enter a recording mode of operation, the provider could offer the user enhanced and even new services. What is needed, then, are methods, systems, and products that allow a provider to control media recording at the user's premises.

SUMMARY

The aforementioned problems, and other problems, are reduced, according to exemplary embodiments, by methods, systems, and products that allow a network, service, and/or content provider to schedule the recording of media. These exemplary embodiments describe how the provider may send instructions to the user's video recorder, computer, or any other electronic device, and those instructions instruct the user's electronic device to record media selected by the provider. The term "media" includes movies, pictures, images, music, text, programs, and data. The provider, for example, may instruct the user's computer to receive and to store any media stream. The provider may additionally or alternatively instruct the user's digital video recorder to receive and to record or store a movie or other programming. As the following paragraphs will explain, because the provider may determine what media is saved or recorded to the user's electronic device, the provider may use that locally-stored media to offer the user enhanced and even new services.

Exemplary embodiments describe a method for recording media. A network command message is received that identifies media to be recorded by a user's device. The network command message was sent on behalf of a network, service, and/or content provider and comprises the provider's instruction to have the user's device record the media. An entry is created in a recording schedule to record the media. The media is received and recorded such that the provider schedules recording of the media.

In another exemplary embodiment, another method is disclosed for recording media. A user's recording schedule is received that indicates media scheduled for recording by a user's device. A network command message is sent on behalf of a provider that comprises the provider's instruction to alter the user's recording schedule, such that the media is recorded at an alternate date and time selected by the provider.

More exemplary embodiments describe a device for recording media. The device comprises a processor communicating with a user interface. The processor receives a network command message that identifies media to be recorded by a user's device. The network command message was sent on behalf of a network, service, and/or content provider and comprises the provider's instruction to have the user's device record the media. The processor creates an entry in a recording schedule to record the media, such that the provider schedules recording of the media.

Still more exemplary embodiments describe another device for recording media. A processor communicates with a network interface and with memory. The processor receives a user's recording schedule that indicates media scheduled for recording by a user's device. The processor sends a network command message on behalf of a provider that comprises the provider's instruction to alter the user's recording schedule, such that the media is recorded at an alternate date and time selected by the provider.

Exemplary embodiments also include a computer program product for recording media. The computer program product stores computer code for receiving a user's recording schedule that indicates media scheduled for recording by a user's device. A network command message is sent on behalf of a provider that comprises the provider's instruction to alter the user's recording schedule, such that the media is recorded at an alternate date and time selected by the provider.

Other exemplary embodiments include more computer program products. Here a user's recording schedule is received that indicates media scheduled for recording by a user's device. A network command message is sent on behalf of a provider that comprises the provider's instruction to alter the user's recording schedule, such that the media is recorded at an alternate date and time selected by the provider.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Figure 1:
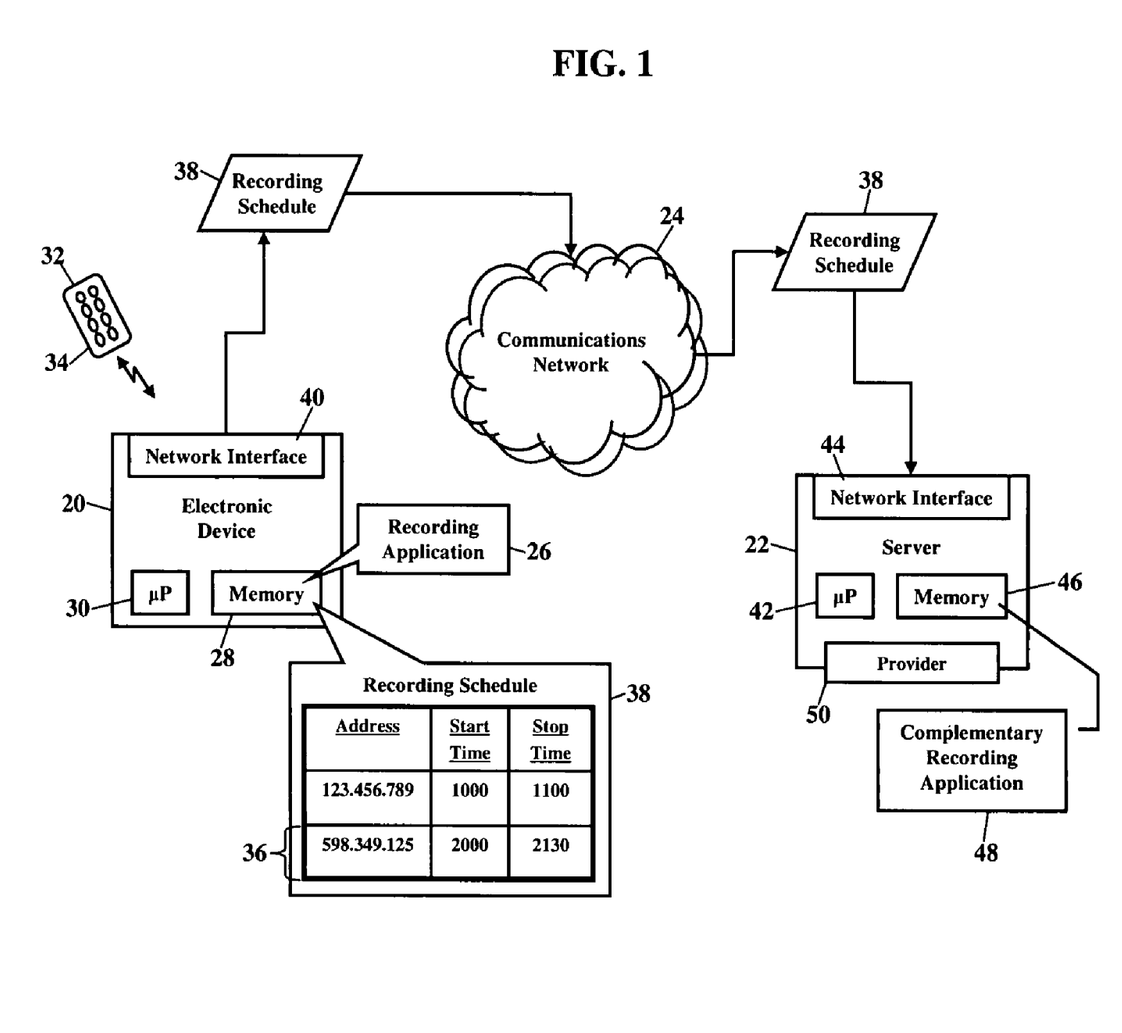
FIG. 1 is a schematic illustrating an operating environment, according to exemplary embodiments.

FIG. 1 is a schematic illustrating an operating environment, according to exemplary embodiments. FIG. 1 illustrates a user's electronic device 20 communicating with a service, network, or content provider's server 22 via a communications network 24. Although the user's electronic device 20 is generically shown, as later paragraphs will explain, the electronic device 20 may be a computer, set-top box, digital recorder, or any other communications device. The user's electronic device 20 stores a recording application 26 in memory 28. The recording application 26 includes processor-executable code or instructions that cause a processor 30 to record some media (e.g., movie, music, and/or image). The processor 30 also communicates with a user interface 32 for indicating what media is to be recorded. The user interface 32 is illustrated as a remote control 34, but the user interface 32 may be a control panel, keypad, keyboard, display, or any other means for receiving spoken or tactile inputs. The processor 30 receives an input via the user interface 32, and the input instructs the processor to create an entry 36 in a recording schedule 38. The recording schedule 38 is stored in the memory 28 and identifies the media selected by the user for recording. The recording schedule 38 may only be momentarily stored or cached in the memory 28, or the recording schedule 38 may be stored for a longer time. However the recording schedule 38 is stored, the recording application 26 instructs the processor 30 to invoke a network interface 40 to communicate the recording schedule 38 to the server 22. The processor 30 thus sends the recording schedule 38 via the communications network 24 to a communications or network address associated with the server 22.

The server 22 receives the recording schedule 38. The server 22 has a processor 42 communicating with a network interface 44 and with memory 46. A complementary recording application 48 is stored in the memory 46 of the server 22. The complementary recording application 48 includes processor-executable code or instructions that cause the processor 42 to receive the user's recording schedule 38 via the network interface 44 to the communications network 24. The recording schedule 38 indicates what media is scheduled for recording by the user's electronic device 20. The recording schedule 38 is mirrored in the memory 46 of the server 22. Because the server 22 is operated by, or on behalf of, a network, service, and/or content provider 50, the provider 50 is notified of the media selected by the user for recording.

The reader is assumed to be generally familiar with recording schedules. If, however, the reader desires more information, the reader is invited to consult the following sources, with each incorporated herein by reference in its entirety: U.S. Pat. No. 6,792,469 to Callahan et al. (Sep. 14, 2004); Published U.S. Patent Application 2002/0144289 to Taguchi et al. (Oct. 3, 2002); Published U.S. Patent Application 2003/0005432 to Ellis et al. (Jan. 2, 2003); Published U.S. Patent Application 2003/0131355 to Berenson et al. (Jul. 10, 2003); Published U.S. Patent Application 2003/0208767 to Williamson et al. (Nov. 6, 2003); Published U.S. Patent Application 2004/0008972 to Haken (Jan. 15, 2004); Published U.S. Patent Application 2004/0013409 to Beach et al. (Jan. 22, 2004); Published U.S. Patent Application 2004/0060063 to Russ et al. (Mar. 25, 2004); Published U.S. Patent Application 2004/0078817 to Horowitz et al. (Apr. 22, 2004); and Published U.S. Patent Application 2005/0229212 to Kuether et al. (Oct. 13, 2005).

Figure 2:
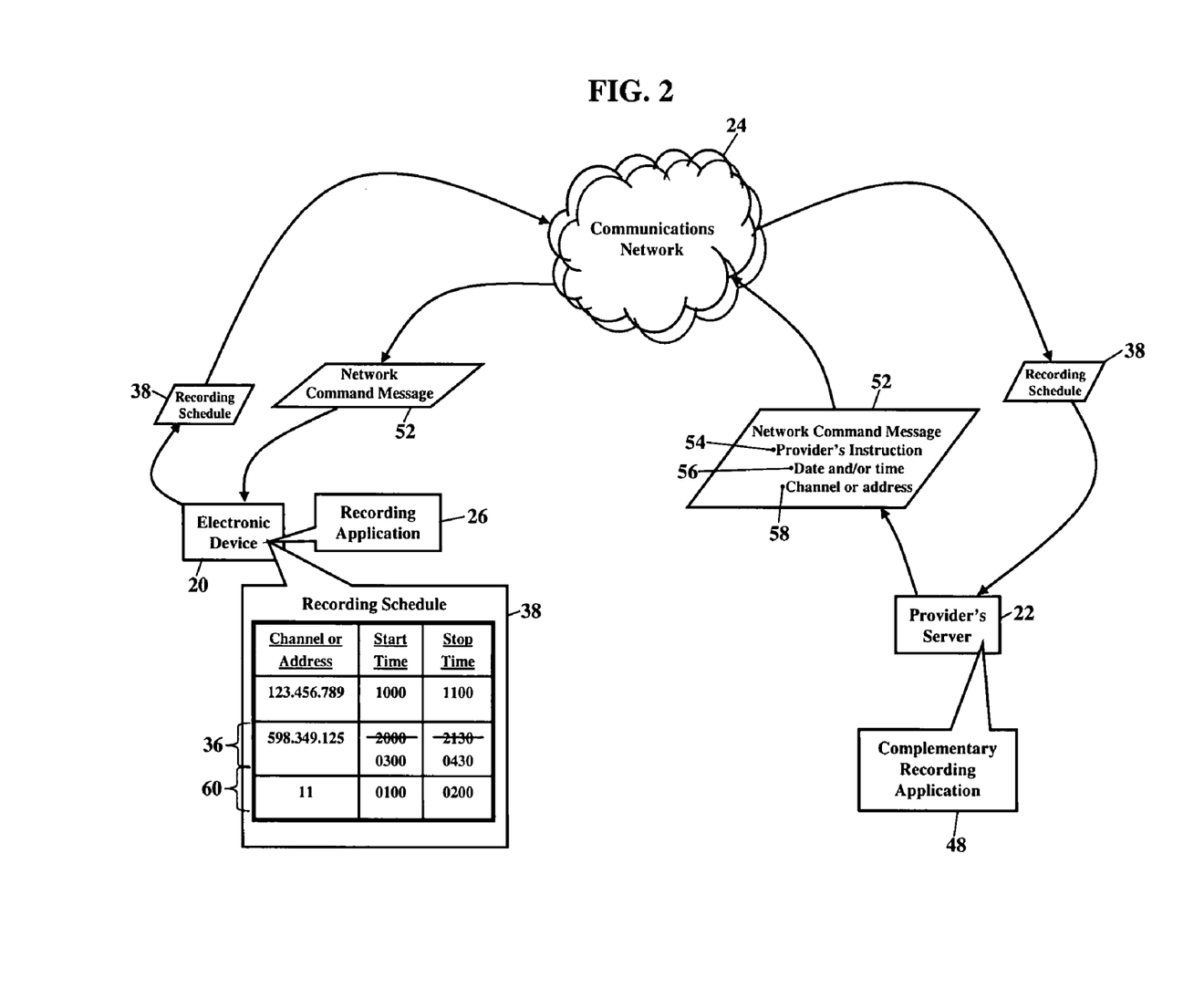
FIG. 2 is a schematic illustrating communications between the user's electronic device and the provider's server, according to more exemplary embodiments.

FIG. 2 is a schematic illustrating communications between the user's electronic device 20 and the provider's server 22, according to more exemplary embodiments. As FIG. 2 illustrates, the server 22 receives the user's recording schedule 38. The recording schedule 38 indicates what media is scheduled for recording by the user's device. The server 22 sends a network command message 52 on behalf of the provider, and the network command message 52 comprises the provider's instruction 54 to have the user's electronic device 20 record the media. That is, the network, service, and/or content provider instructs the user's electronic device 20 when to record media selected by the provider. The network command message 52 may identify a date and/or time 56 to begin a recording mode of operation. The network command message 52 may also identify a channel and/or communications address 58 further associated with the media selected by the provider. The network command message 52 may further identify the media by title, programming identification, path, link, start/end time, or other identifying information.

The user's electronic device 20 receives the network command message 52. The recording application 26 instructs the processor (shown as reference numeral 30 in FIG. 1) to create or to revise the entry 36 in the recording schedule 38. The network command message 52, for example, may create a new entry 60 in the recording schedule 38, and the new entry 60 corresponds to the media the provider wishes to be recorded. The network command message 52, however, may alter the existing entry 36, such that the media is recorded at an alternate date and/or time selected by the provider. Suppose, for example, that the user's recording schedule 38 indicates the user wishes to record the movie CASABLANCA® at 8 P.M., a time of peak bandwidth/usage demand The provider, however, may know that the movie CASABLANCA® is also scheduled for a 3 A.M. broadcast, when bandwidth demand is less. The provider, then, alters the user's recording schedule 38 such that the user's electronic device 20 records the movie CASABLANCA® during the alternate 3 A.M. broadcast. The user's electronic device 20 still records the user's desired media, but the network, service, and/or content provider has judiciously conserved bandwidth by altering the recording schedule 38.

Figure 3:
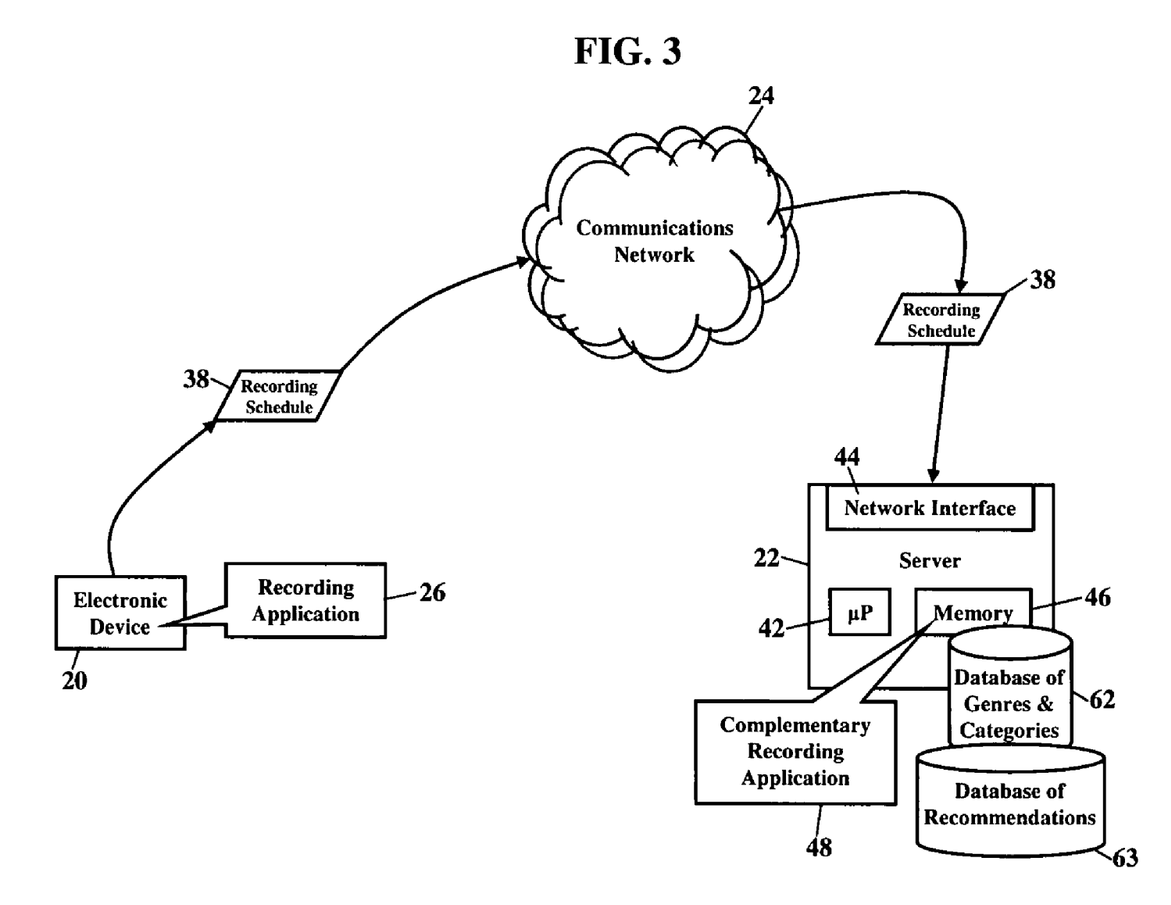
FIG. 3 is a schematic illustrating a database of genres and categories, according to still more exemplary embodiments.

FIG. 3 is a schematic illustrating a database 62 of genres and categories, according to still more exemplary embodiments. Because the provider's server 22 receives the user's recording schedule 38, the provider may use the database 62 of genres and categories to determine what media appeals to the user. That is, when the complementary recording application 48 receives the user's recording schedule 38, the complementary recording application 48 may analyze the user's recording schedule 38. The complementary recording application 48 may instruct the processor 42 to determine additional media that may appeal to the user. The complementary recording application 48, for example, could map or otherwise associate titles, genres, or categories of media. The processor 42, for example, could query the database 62 of genres and categories. The database 62 of genres and categories maps the title of media to genres and categories. The database 62 of genres and categories returns additional titles of media having the same or similar genre, category, actor(s), actress(es), or any other attributes as those selected by the user for recording. Moreover, the database 62 of genres and categories may additionally contain, or have access to, e.g., advertisements for products and/or services that appeal to each genre or category. The complementary recording application 48 analyzes the user's recording schedule 38 to determine patterns of viewership. The complementary recording application 48 may then consult the database 62 of genres and categories for additional media and advertisements related to those patterns of viewership.

The complementary recording application 48 may additionally or alternatively access a database 63 of recommendations. The database 63 of recommendations maps, associates, or otherwise relates recommended media content. The processor 42 queries the database 63 of recommendations for the title of media selected for recording. The database 63 of recommendations returns titles of recommended media that are associated with the recorded media. If the user has scheduled a Woody Allen movie for recording, the database 63 of recommendations might return other Woody Allen movie titles. The database 63 of recommendations may return any media recommendation having the same or similar genre, category, actor(s), actress(es), or any other attributes as those selected by the user for recording. Moreover, the database 63 of recommendations may additionally contain, or have access to, advertisements for products and/or services that appeal to such recommendations.

Figure 4:
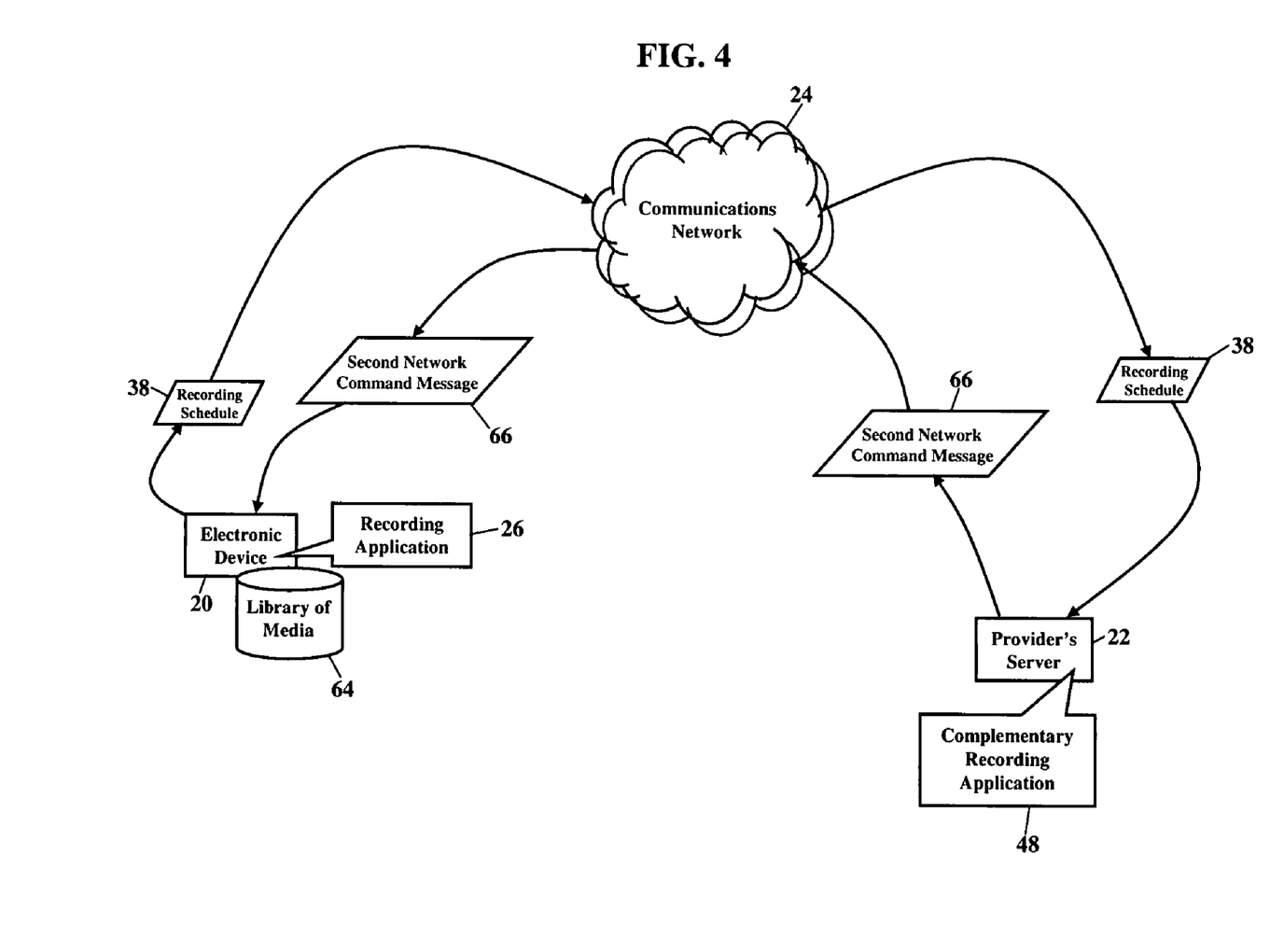
FIG. 4 is a schematic illustrating a library of media, according to exemplary embodiments.

FIG. 4 is a schematic illustrating a library 64 of media, according to exemplary embodiments. Here the provider's server 22 may create the library 64 of media on the user's electronic device 20. Again, because the network, service, and/or content provider's server 22 received the user's recording schedule 38, the provider may determine what additional media appeals to the user. Once that additional media is known (perhaps using the database 62 of genres and categories shown in FIG. 3), the provider's server 22 may then pre-position or preload that additional media to the user's electronic device 20. As FIG. 4 illustrates, the complementary recording application 48 may unilaterally send another network command message 66. This second network command message 66 may instruct the user's electronic device 20 to record the additional media at a date and time selected by the provider. Because the provider's complementary recording application 48 has determined additional media that may appeal to the user, the complementary recording application 48 may instruct the user's electronic device 20 to record that additional media. When the additional media is received by the user's electronic device 20, the electronic device 20 records that additional media, according to the provider's instructions. The provider may thus unilaterally create the library 64 of media on the user's electronic device 20.

Figure 5:
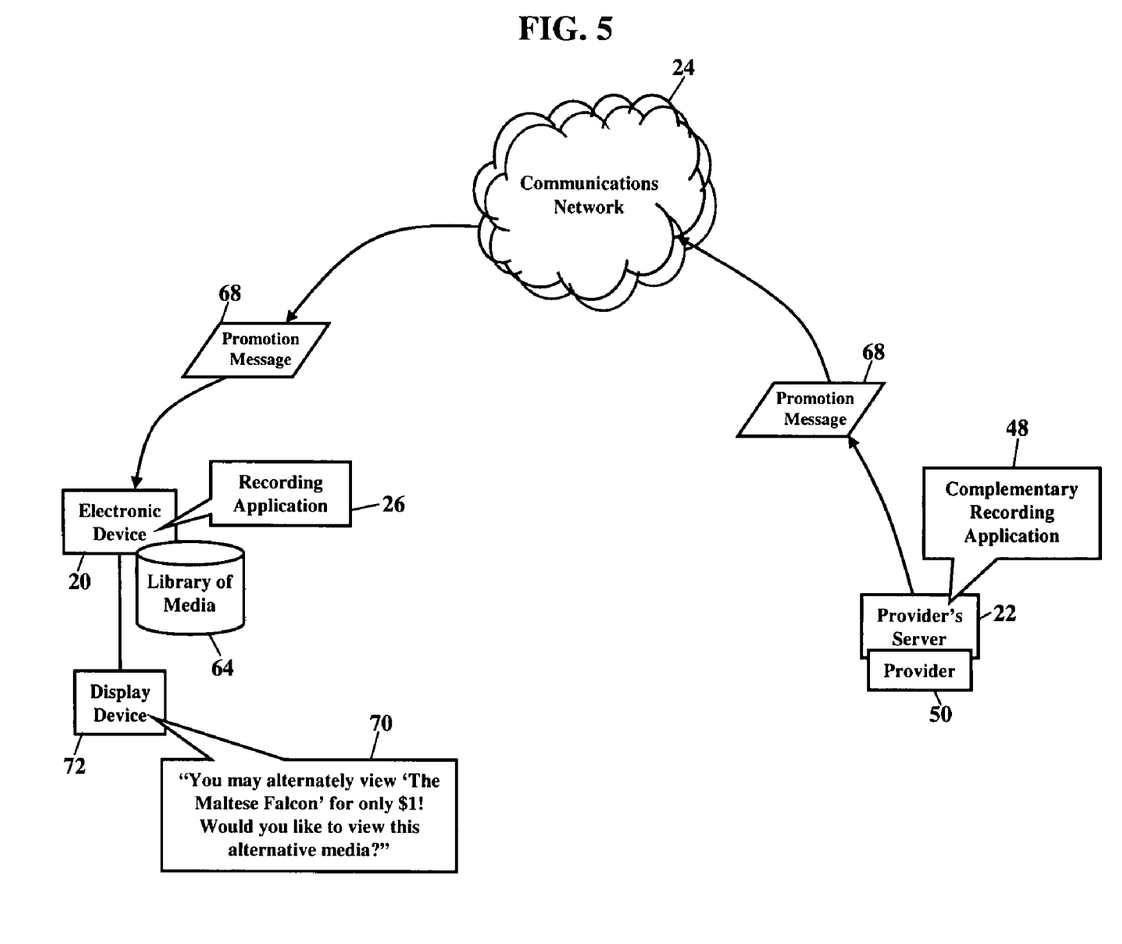
FIG. 5 is a schematic illustrating the promotion of locally recorded/stored media, according to even more exemplary embodiments.

FIG. 5 is a schematic illustrating the promotion of locally recorded/stored media, according to even more exemplary embodiments. Here the server 22 sends a promotion message 68 on behalf of the network, service, and/or content provider 50. The promotion message 68 promotes the consumption of media available from the user's electronic device 20. The promotion message 68, for example, may promote some media from the library 64 of media stored on the user's electronic device 20. When the recording application 26 receives the promotion message 68, the recording application 26 causes the processor to create a visual and/or audible prompt 70. FIG. 5, for example, illustrates the prompt 70 visually produced via a display device 72 communicating with the user's electronic device 20. The prompt 70 promotes locally stored media stored on, or accessible to, the user's electronic device 20.

The promotion message 68 may help reduce bandwidth consumption. When network traffic is high, the provider 50 may send the promotion message 68 to alleviate congestion. Again, because network demand sometimes peaks during the evening hours, the provider 50 may incentivize the user to accept locally-stored media, instead of consuming network or "last mile" bandwidth. The promotion message 68 may prompt the user (via the visual and/or audible prompt 70) to accept an alternative selection of media from the library 64 of media. The promotion message 68 may also be sent when the contention for bandwidth along the user's "last mile" link is exceeding the available capacity. The promotion message 68 offers media that should appeal to the user, based on her/his recording schedule (shown as reference numeral 38 in FIGS. 1-4).

Figure 6:
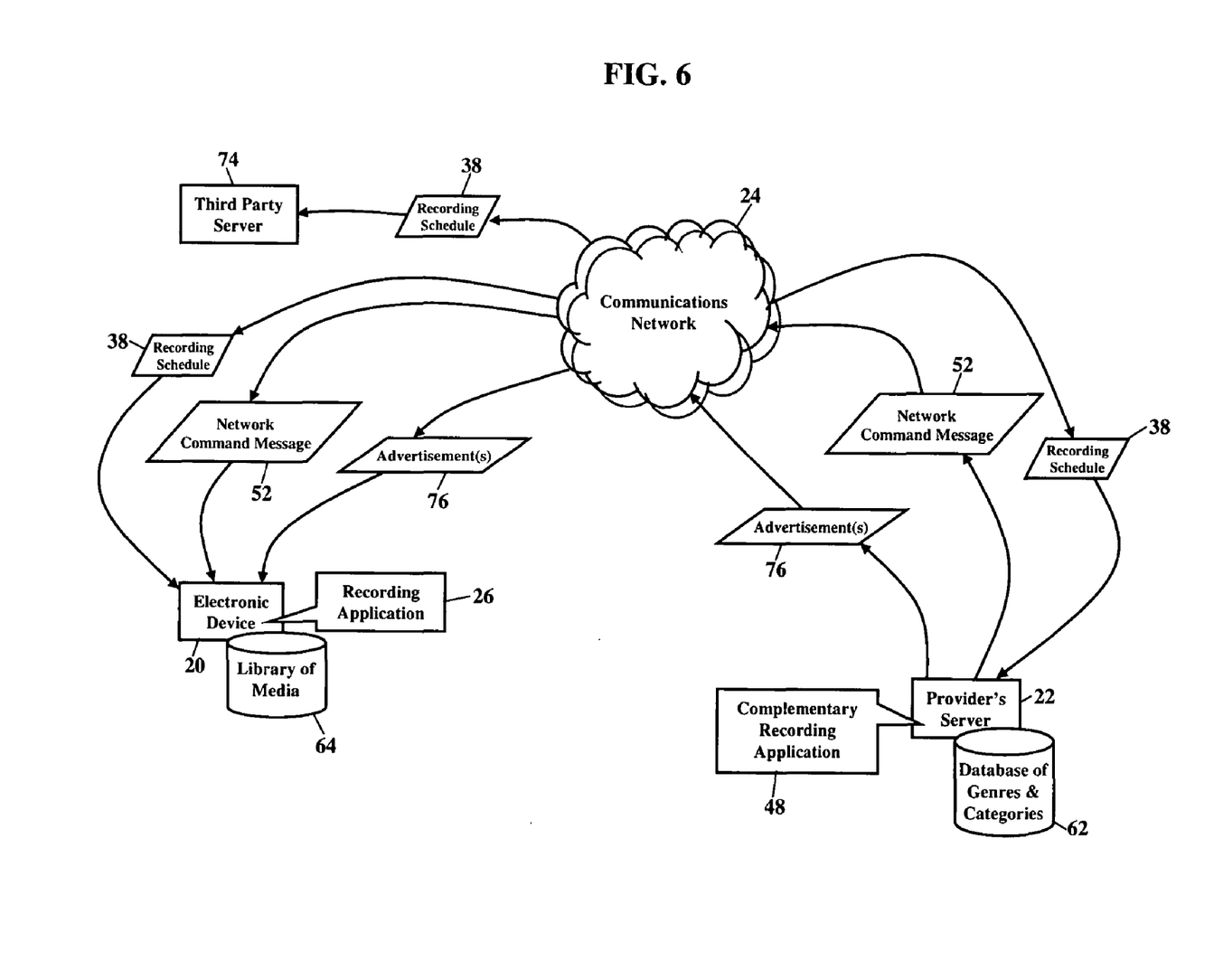
FIG. 6 is a schematic illustrating the distribution of advertising media, according to even more exemplary embodiments.

FIG. 6 is a schematic illustrating the distribution of advertising media, according to even more exemplary embodiments. Again, because the provider's server 22 received the user's recording schedule 38, the network, service, and/or content provider may determine what advertising is relevant to the user's need and desires. The user's recording schedule 38 may be analyzed to determine what media, and what advertising, may appeal to the user. The database 62 of genres and categories, for example, may be used to map the title of recorded media to advertisements for products and/or services that appeal to each genre or category. The user's recording schedule 38 may even be sent to third parties for analysis. The user's recording schedule 38, for example, may be sent to a server 74 associated with an advertiser, a marketer, or consultant. The user's recording schedule 38 is preferably anonymously sent to the third party to alleviate confidentiality, privacy, and other concerns.

Relevant advertising media may also be selected based, for example, on the user's demographic information. Exemplary embodiments may use demographic information to schedule and to record advertising media that is relevant to the user. The demographic information may be obtained via method, such as questionnaires, surveys, and online interactions. Exemplary embodiments may also obtain demographic information using a registration process. When the user registers the electronic device 20 with the provider's server 22, for example, the registration process may identify the user and/or the user's electronic device 20. The registration process may even include demographic information that helps identify media preferences for the registering user. The registration process, and the demographic information, however, is more explained in the co-pending and commonly assigned U.S. application Ser. No. 11/413,886, concurrently filed and entitled "Methods, Systems, and Products for Recording Media", and incorporated above by reference.

FIG. 6, then, illustrates the distribution of advertising media. Because the provider's server 22 receives the user's recording schedule 38, and perhaps the user's demographic information, the provider may determine what advertising is relevant to the user. The provider's server 22 sends the network command message 52 to schedule recording of any advertisements. The provider then sends the advertisements 76 to the user's electronic device 20. The advertisements 76 may be sent as part of a multicast stream, or the advertisements may be stacked back-to-back and placed on a channel. The complementary recording application 48 may even individually configure the network command message 52 such that only targeted advertisements are recorded. Knowing the user's demographic information, for example, the complementary recording application 48 may configure the network command message 52 such that only advertisements with a matching demographic are recorded. Because the provider also knows the user's recording schedule 38, the complementary recording application 48 may schedule the recording of advertisements that appeal to the recorded media. The network command message 52, therefore, may be used to record relevant and targeted advertisements. Once those relevant advertisements are recorded/stored to the user's electronic device 20, each advertisement may be retrieved and inserted into a stream or into programming, as is already known.

Figure 7:
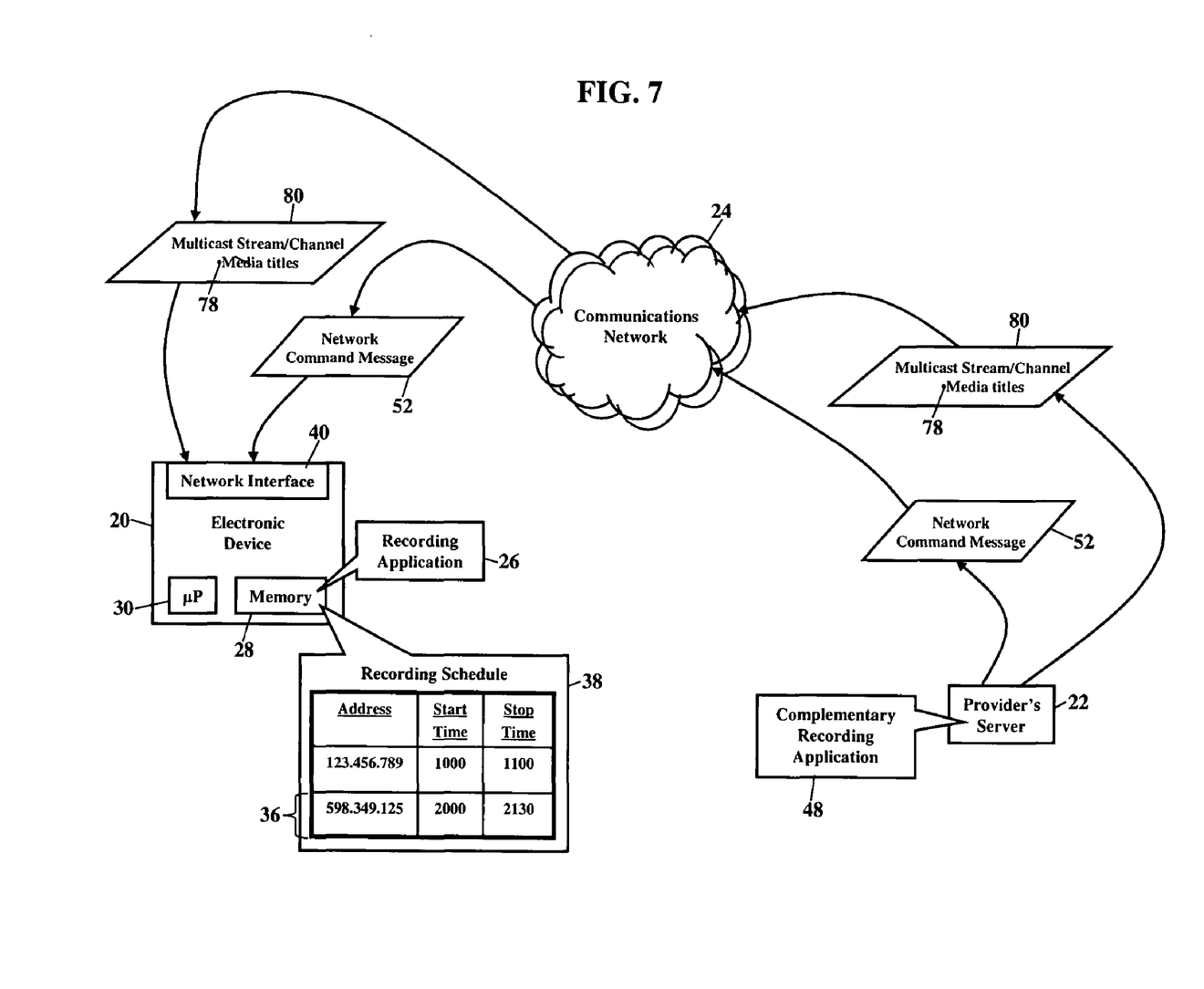
FIG. 7 is a schematic illustrating video-on-demand service, according to exemplary embodiments.

FIG. 7 is a schematic illustrating video-on-demand service, according to exemplary embodiments. Here the network command message 52 is used to offer video-on-demand service. The conventional video-on-demand services permit the user to access a video library, select a desired title, and then have that title streamed to the user's electronic device 20. Here, however, the network command message 52 is used to establish a video-on-demand service. The provider's server 22 stacks the video-on-demand media titles 78 into a multicast stream or channel 80. The network command message 52 is sent to the user's electronic device 20 to create the entry 36 in the recording schedule 38 (as the above paragraphs explained). The complementary recording application 48 sends the network command message 52 to schedule recording of any of the media titles 78 at the time of the multicast. Some or all of the titles 78 are thus cached to the memory 28 in the user's electronic device 20. The multicast stream or channel 80 may be scheduled during periods of little or less demand. Whenever the user should then request this video-on-demand service, each individual media title 78 need not be streamed over the communications network 24. The desired media title 78 is, instead, retrieved from the local memory 28 of the user's electronic device 20. Because the media titles 78 are delivered via the multicast stream or channel 80, the costs to the provider are less. This video-on-demand service results in an increase in the margin for that media product 78. That increased margin may make the media product available to the customer at a lower price, or the increased margin may be realized as profit for the provider. This video-on-demand service thus improves the user's experience, improves the utilization of the communications network 24, and lowers the provider's costs of providing services.

Exemplary embodiments are applicable to any communications network. The communications network 24, for example, may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards).

Figure 8:
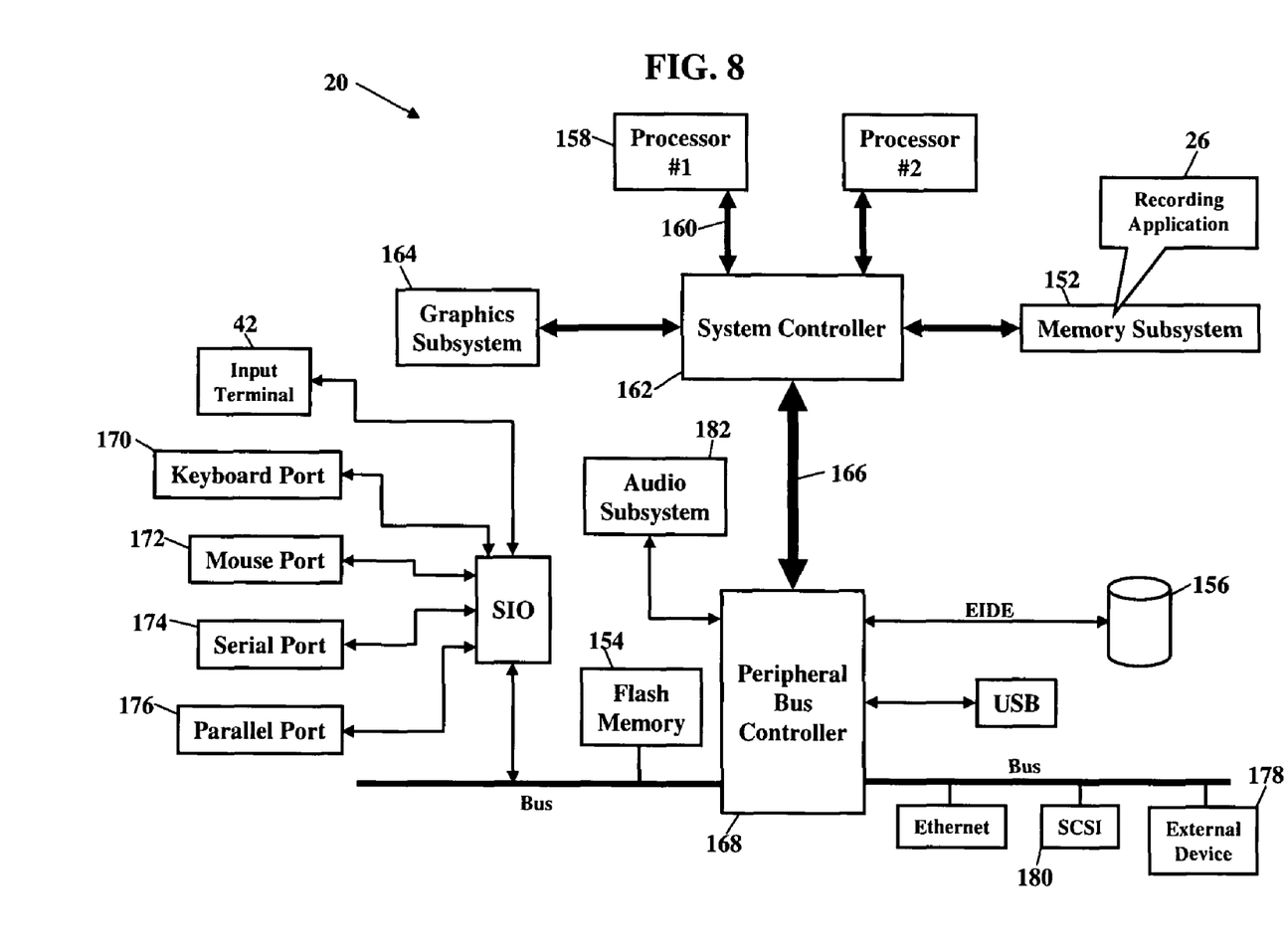
FIG. 8 is a block diagram of exemplary details of the electrical device shown in FIGS. 1-7.

FIG. 8 is a block diagram of exemplary details of the electrical device 20 shown in FIGS. 1-7. FIG. 8 is also a block diagram of exemplary details of the provider's server 22 shown in FIGS. 1-7. The electronic device 20 and/or the provider's server 22 may be any device capable of storing and/or recording any media. The electronic device 20 and/or the provider's server 22, for example, may be any device, such as an analog/digital recorder, television, CD/DVD player/recorder, audio equipment, receiver, tuner, and/or any other consumer electronic device. The electronic device 20 and/or the provider's server 22 may also include any computer, peripheral device, camera, modem, storage device, telephone, personal digital assistant, and/or mobile phone. The electronic device 20 and/or the provider's server 22 may also be configured as a set-top box ("STB") receiver that receives and decodes digital signals. The electronic device 20 and/or the provider's server 22, in fact, can be any electronic/electrical device that has an input 150 for receiving an input. The input 150 may include a coaxial cable interface for receiving signals via a coaxial cable (not shown). The input 150 may additionally or alternatively include an interface to a fiber optic line, to a telephone line (such as an RJ-48/56), to other wiring, and to any male/female coupling. The recording application 26 operates within a system memory device. The recording application 26, for example, is shown residing in a memory subsystem 152. The recording application 26, however, could also reside in flash memory 154 or peripheral storage device 156. The electrical device 20 also has one or more central processors 158 executing an operating system. The operating system, as is well known, has a set of instructions that control the internal functions of the electrical device 20. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. The electrical device 20 may also include a display device (such as LED, LCD, plasma, or any other) to present instructions, messages, tutorials, and other information to a user. The electrical device 20 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the electrical device 20.

Figure 9:
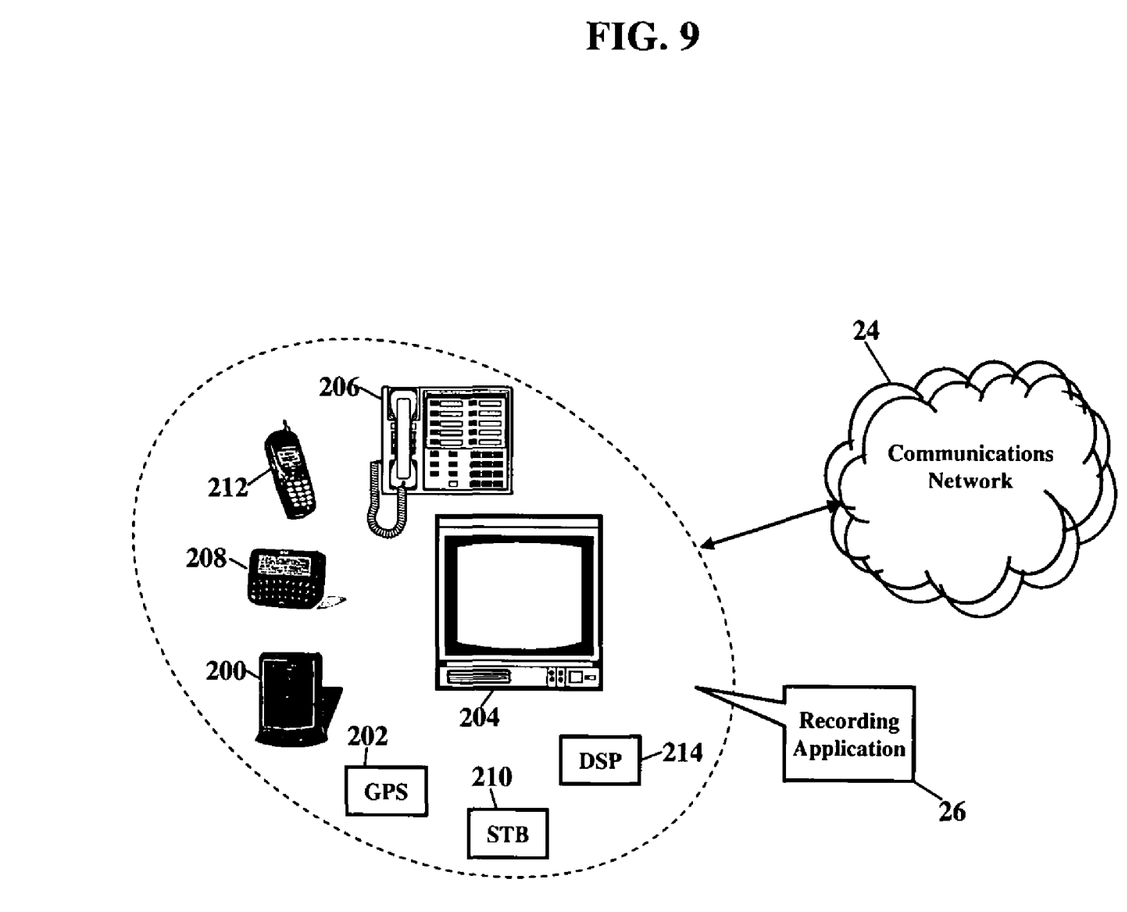
FIG. 9 is a schematic illustrating additional communications devices in which exemplary embodiments may operate.

FIG. 9 is a schematic illustrating still more exemplary embodiments. FIG. 9 illustrates that the recording application 26 may alternatively or additionally operate within various other communications devices. FIG. 9, for example, illustrates that the recording application 26 may entirely or partially operate within a personal digital assistant (PDA) 200, a Global Positioning System (GPS) device 202, an interactive television 204, an Internet Protocol (IP) phone 206, a pager 208, a set-top-box (STB) 210, a cellular/satellite phone 212, or any computer system and/or communications device utilizing a digital signal processor (DSP) 214. The communications device may also include watches, radios, vehicle electronics, clocks, printers, gateways, and other apparatuses and systems.

The recording application 26 may be utilized regardless of signaling standard. As those of ordinary skill in the art recognize, some communications devices utilize a Global System for Mobile (GSM) standard. Some other communications devices utilize the Time Division Multiple Access signaling standard, the Code Division Multiple Access signaling standard, the "dual-mode" GSM-ANSI Interoperability Team (GAIT) signaling standard, or a variant of the GSMICDMA/TDMA signaling standard. Exemplary embodiments, however, may be applied to any communications device utilizing any signaling standard or compression technique. Exemplary embodiments may also be applied to any device utilizing any portion of the electromagnetic spectrum, such as the Industrial, Scientific, and Medical band (e.g., BLUETOOTH®).

Figure 10:
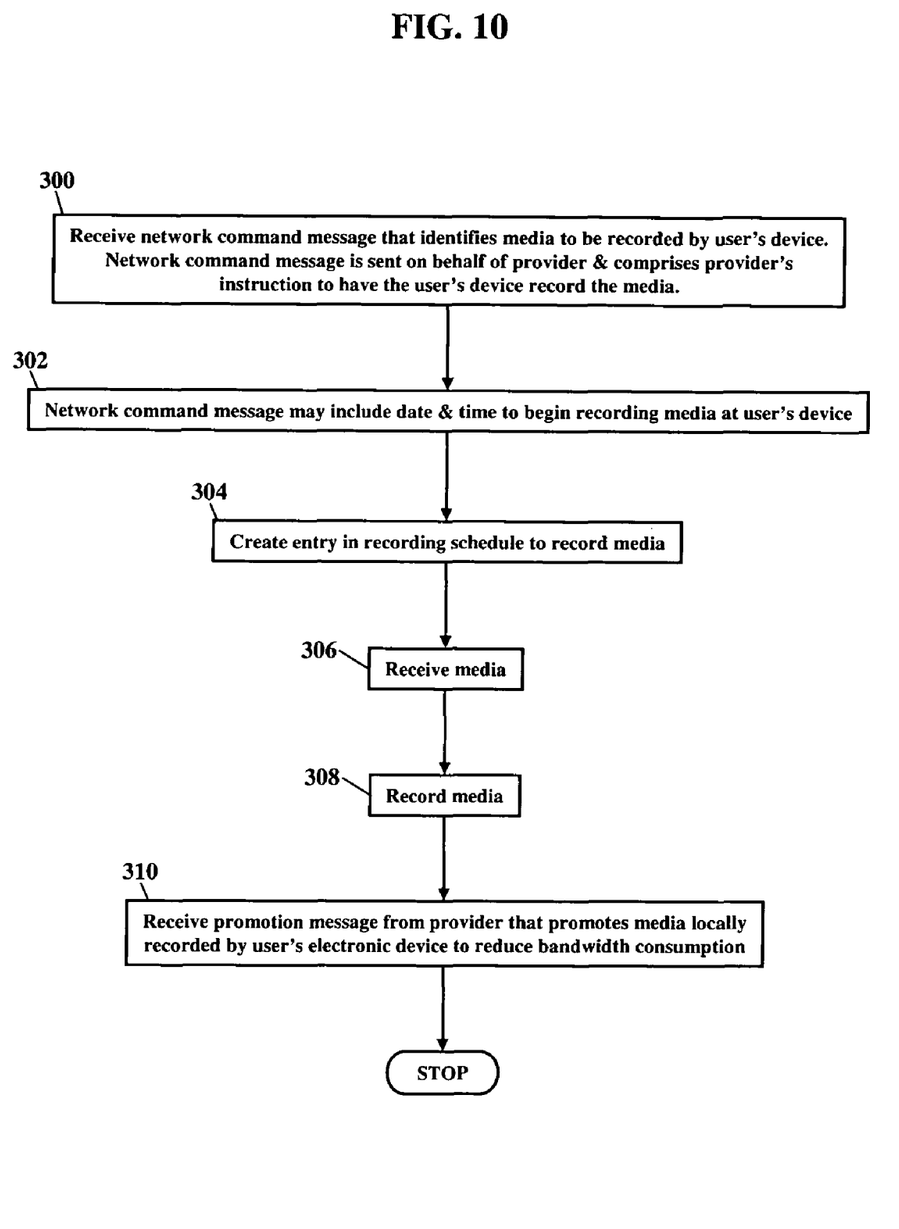
FIGS. 10 and 11 are flowcharts illustrating methods of recording media, according to more exemplary embodiments.

FIG. 10 is a flowchart illustrating a method for recording media, wherein a network, service, and/or content provider schedules recording of the media. A network command message is received that identifies media to be recorded by a user's device (Block 300). The network command message is sent on behalf of a provider and comprises the provider's instruction to have the user's device record the media. The network command message may include a date and time to begin recording the media at the user's device (Block 302). An entry is created in a recording schedule to record the media (Block 304). The media is received (Block 306) and recorded (Block 308). A promotion message may be received from the provider (Block 310), and the promotion message promotes the media locally recorded by the user's electronic device to reduce bandwidth consumption.

Figure 11:
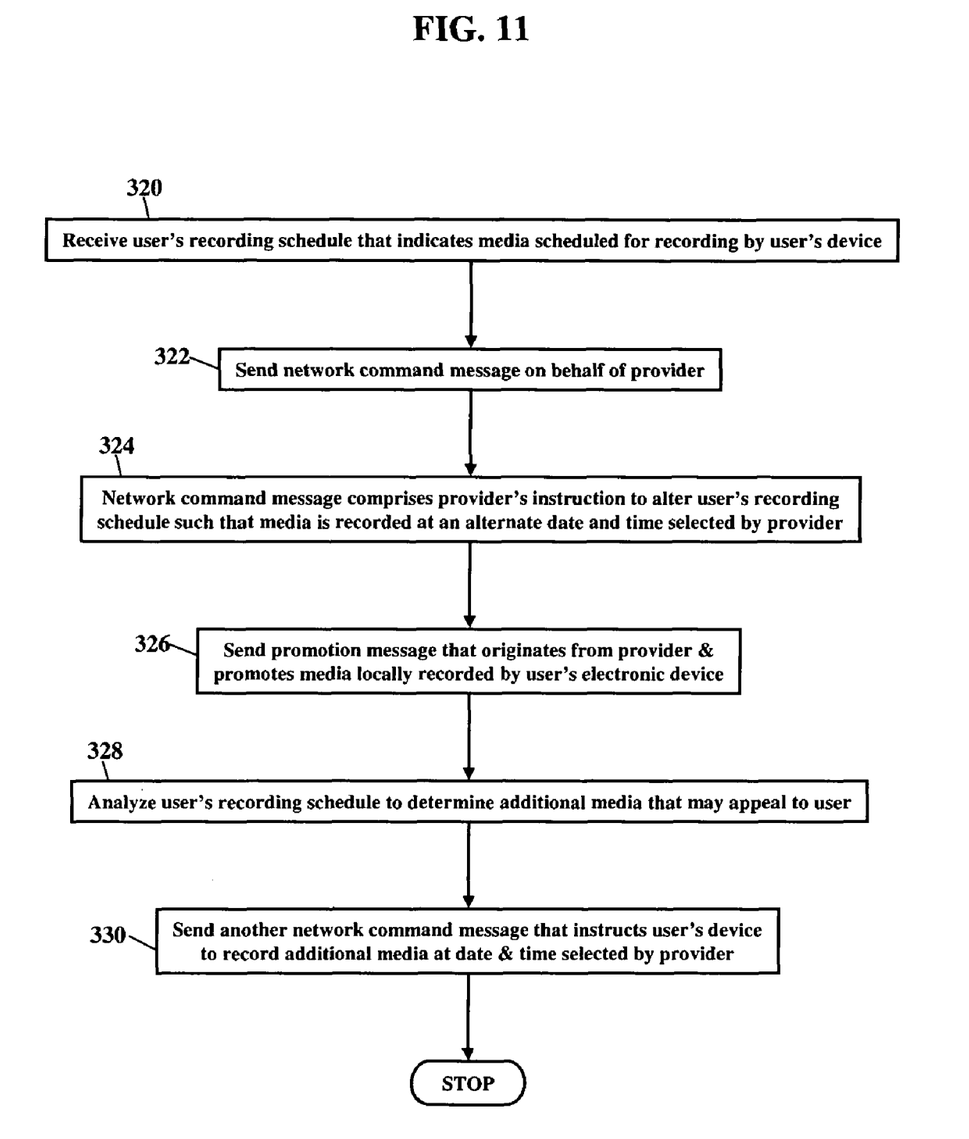

FIG. 11 is another flowchart illustrating another method for recording media, wherein a network, service, and/or content provider schedules recording of the media. A user's recording schedule is received that indicates media scheduled for recording by a user's device (Block 320). A network command message is sent on behalf of the provider (Block 322). The network command message comprises the provider's instruction to alter the user's recording schedule such that the media is recorded at an alternate date and time selected by the provider (Block 324). A promotion message is sent that originates from the provider, and the promotion message promotes the media locally recorded by the user's electronic device to reduce bandwidth consumption (Block 326). The user's recording schedule is analyzed to determine additional media that may appeal to the user (Block 328). Another network command message may be sent that instructs the user's device to record the additional media at a date and time selected by the provider (Block 330).

The recording application 26 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the recording application 26 to be easily disseminated. A computer program product for recording media comprises the computer-readable medium, and the recording application 26 stores on the computer-readable medium as processor-executable code or instructions.

The recording application 26 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for recording media, comprising:

transmitting a recording schedule from a user electronic device over a network to a media provider, the recording schedule including media yet to be recorded, wherein transmitting the recording schedule sends the recording schedule to a network address associated with the media provider, such that the media provider mirrors the user recording schedule on a media provider server;

receiving a network command message from the media provider to the user electronic device that identifies media to be recorded by the user electronic device, the network command message for scheduling recording of the media by the user electronic device, the network command message including an instruction to alter a recording time for the media yet to be recorded to a time of lower bandwidth demand on the network, wherein the network command message that identifies media to be recorded at the user device includes a date and time to begin recording the media at the user device, a path, and a link;

creating an entry in the user recording schedule of media yet to be recorded on the user device in response to the network command message;

receiving the media yet to be recorded;

recording the media yet to be recorded;

in response to the media provider determining additional media by analyzing the user recording schedule to determine the additional media, preloading the additional media unilaterally on the user device over a multicast stream during the time of low bandwidth demand on the network, the determining additional media including detecting genres and categories of items in the user recording schedule and determining the additional media in response to the genres and categories of items in the user recording schedule to unilaterally create a library of media on the user electronic device;

receiving a promotion message from the media provider, the promotion message promoting viewing of the media unilaterally preloaded on the user device to reduce bandwidth consumption, the promotion message being sent during a time of high bandwidth demand on the network and when bandwidth demand by the user electronic device exceeds available capacity on a last mile link to the user device, the promotion message indicating a fee for viewing of the media unilaterally preloaded on the user device, the fee being a lower price as compared to viewing video-on-demand not unilaterally preloaded on the user device; and receiving a targeted advertisement separate from the promotional message, the targeted advertisement derived in response to the genres and categories of items in the user recording schedule and user demographic information provided during a user registration process, the targeted advertisement received from an advertiser server and the targeted advertisement promoting products, wherein a plurality of targeted advertisements are stacked back-to-back and placed on a channel delivered to the user device, the targeted advertisement being retrieved and inserted into media upon viewing.

\* \* \* \* \*